No. 637,006. Patented Nov. 14, 1899.
L. M. MAXHAM.
SYSTEM OF ELECTRIC TRACTION.
(Application filed Feb. 25, 1899.)
(No Model.) 4 Sheets—Sheet 1.
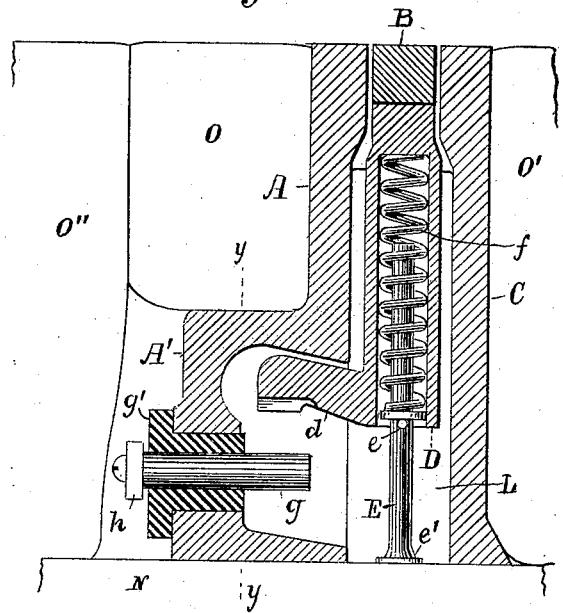
Fig. 1
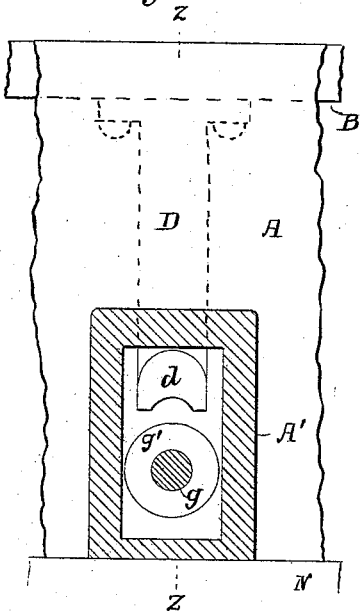
Fig. 2
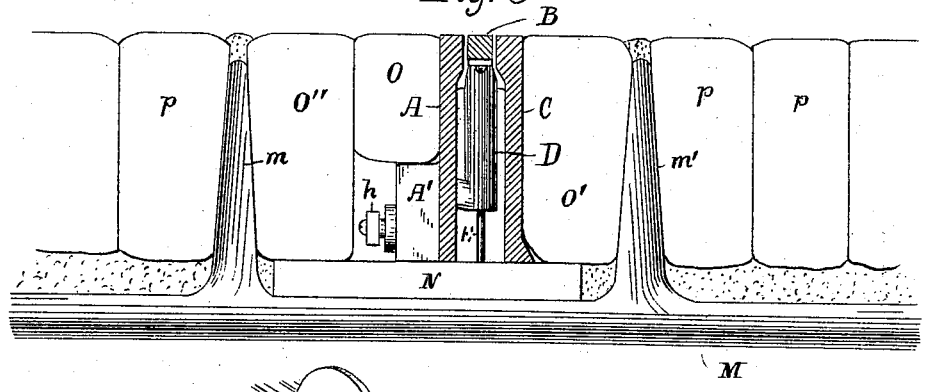
Fig. 3
Fig. 4
Attest:
J. E. Caller
Margaret L. Waite
Inventor,
Lowell Mason Maxham;
By A. B. Stepham,
His Attorney.

No. 637,006. Patented Nov. 14, 1899.
L. M. MAXHAM.
SYSTEM OF ELECTRIC TRACTION.
(Application filed Feb. 25, 1899.)
(No Model.) 4 Sheets—Sheet 2.
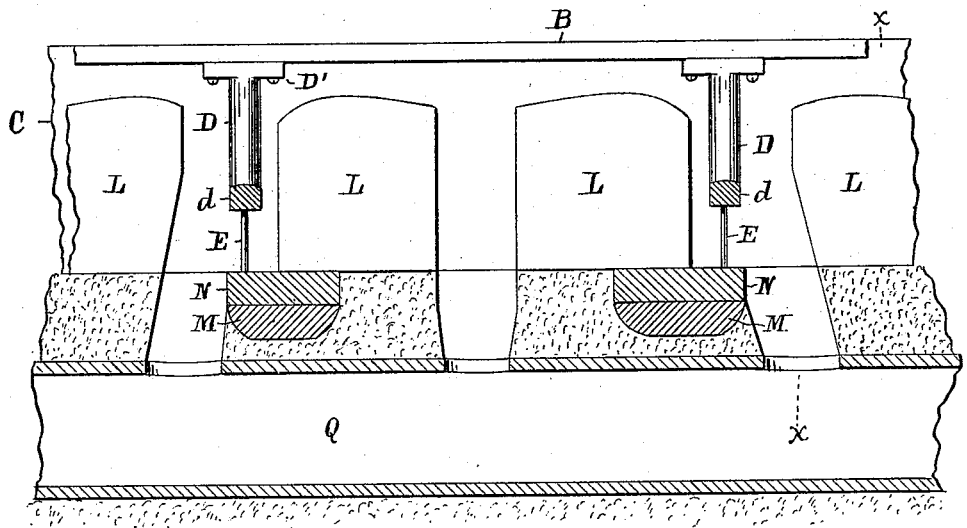
Fig. 5
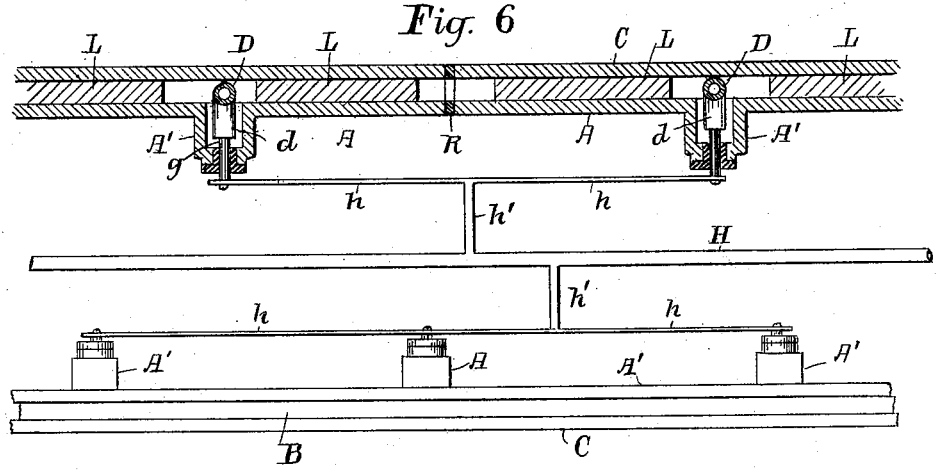
Fig. 6
Fig. 7
Attest:
F. E. Caller
Margaret L. Waite
Inventor,
Lowell Mason Maxham;
By A. B. Upham,
His Attorney.

No. 637,006. Patented Nov. 14, 1899.
L. M. MAXHAM.
SYSTEM OF ELECTRIC TRACTION.
(Application filed Feb. 25, 1899.)
(No Model.) 4 Sheets—Sheet 3.
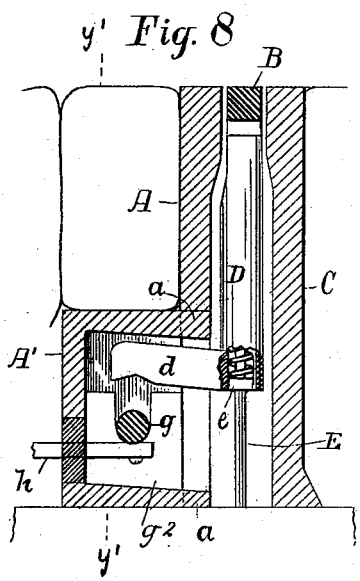
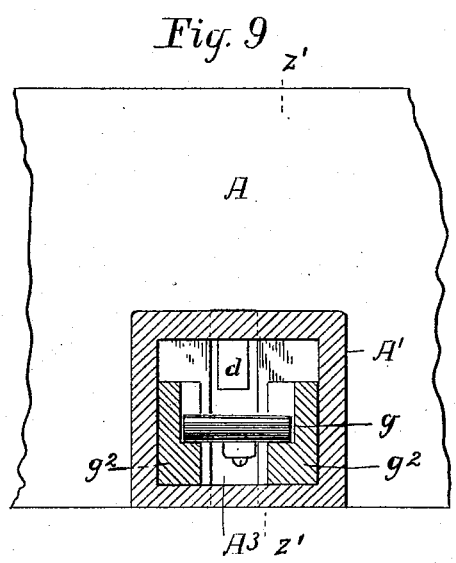
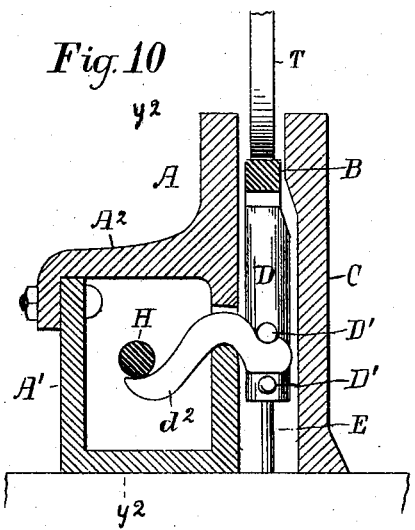
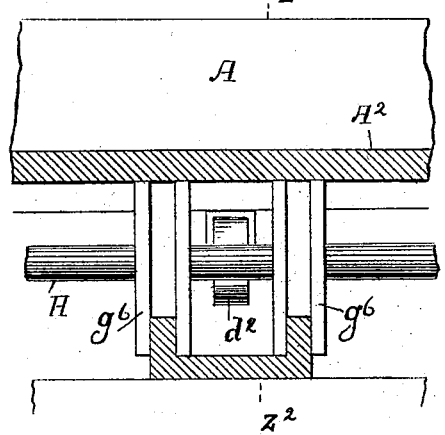
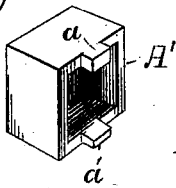
Attest;
F. E. Caller
Margaret L. Waite
Inventor,
Lowell Mason Maxham;
By A. B. Upham,
His Attorney.

No. 637,006.  
L. M. MAXHAM.  
SYSTEM OF ELECTRIC TRACTION.  
(Application filed Feb. 25, 1899.)

Patented Nov. 14, 1899.

(No Model.)

4 Sheets—Sheet 4.

Attest:  
F. E. Caller  
E. E. Waite

Inventor,  
Lowell Mason Maxham;  
A. B. Upham,  
His Attorney.

THE NORRIS PETERS CO., PHOTO-LITHO., WASHINGTON, D. C.

UNITED STATES PATENT OFFICE.

LOWELL MASON MAXHAM, OF BOSTON, MASSACHUSETTS.

SYSTEM OF ELECTRIC TRACTION.

SPECIFICATION forming part of Letters Patent No. 637,006, dated November 14, 1899.

Application filed February 25, 1899. Serial No. 706,767. (No model.)

*To all whom it may concern:*

Be it known that I, LOWELL MASON MAXHAM, a citizen of the United States, residing at Boston, in the county of Suffolk and State of Massachusetts, have invented a new and useful System of Electric Traction, of which the following is a full, clear, and exact description.

This invention embodies a system of electric traction in which a current of electricity is shunted to the motor of a railway-car from a conductor located in the track and normally insulated from any points of contact liable to be touched by pedestrians, animals, or vehicles passing along or over such track. The construction which I have invented and devised for this purpose is operated wholly without the aid of magnets, storage batteries, or switches, is simple and inexpensive in manufacture, not liable to become disarranged or inoperative through the stress of accident or weather, is positive in action, and incapable of becoming a menace to any passer-by.

Figures 13, 14:
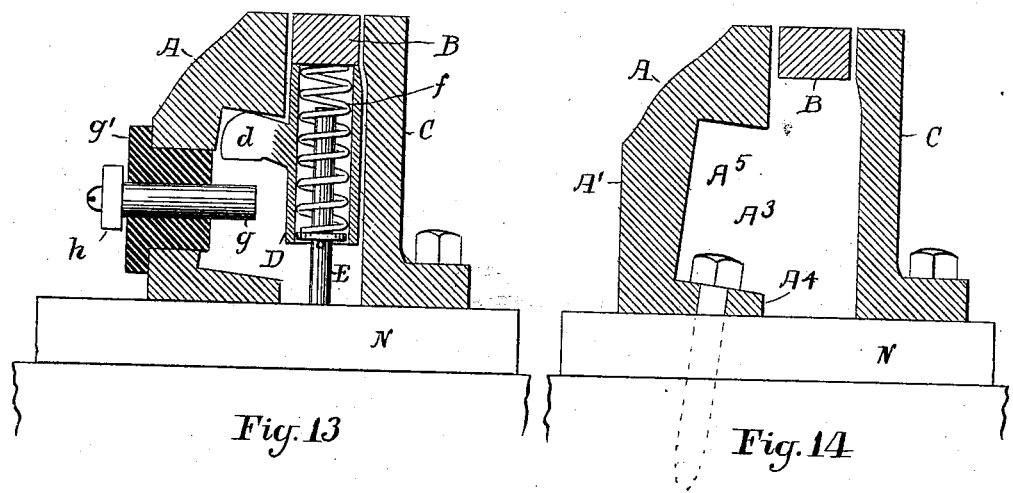
Figure 15:
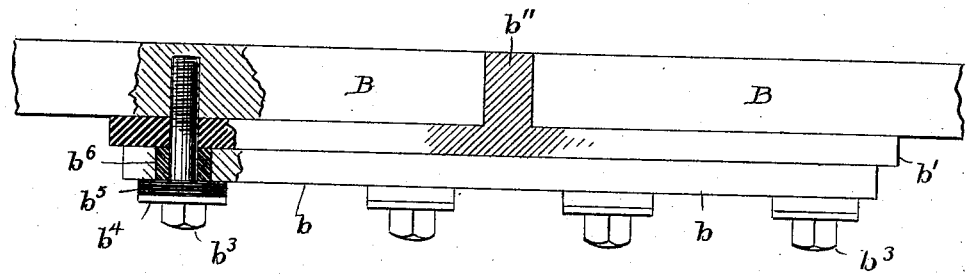
Figure 16:
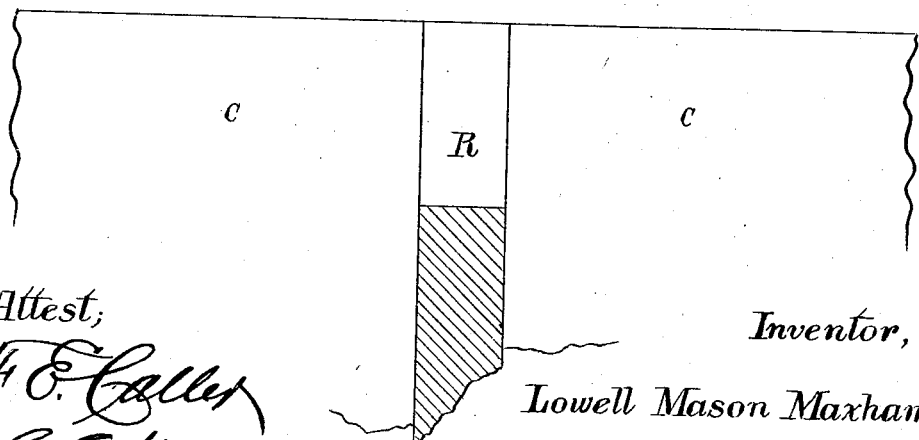

Referring to the drawings forming part of this specification, Figure 1 is a transverse section of the shunting device on nearly full size and on the line Z Z in Fig. 2. Fig. 2 is a section of the same on the line Y Y in Fig. 1. Fig. 3 is a transverse section of the complete arrangement upon a smaller scale. Fig. 4 is a perspective sectional view illustrating the means for taking the current therefrom. Fig. 5 is a longitudinal section of the device, showing the manner of draining the same. Fig. 6 is a plan view, partly in section and partly in diagram, showing the main feed-conductor and the method of connecting my contact device therewith. Fig. 7 is a cross-section on the line X X in Fig. 5. Fig. 8 is a cross-section of a modification of my invention at Z' Z' in Fig. 9. Fig. 9 is a section of the same on the line Y' Y' in Fig. 8. Fig. 10 is another modification illustrated in section on the line $Z^2 Z^2$ in Fig. 11. Fig. 11 is a sectional view of the same on the line $Y^2 Y^2$ in Fig. 10. Fig. 12 is a perspective view, on a smaller scale, of a portion of the construction shown in Fig. 8. Fig. 13 is a cross-section of a form of the invention adapted for use in connection with tracks unprovided with paving. Fig. 14 is a sectional view of the same modification, showing the plates alone. Fig. 15 is a detail view, partly in section, illustrating my method of making my intermediate conductor mechanically continuous, but electrically separate; and Fig. 16 is a sectional elevation indicating the means for insulating the ends of adjacent plates.

As shown in Fig. 4, my preferred means for taking the current from the normally-insulated conductor consists of two tandem trolleys carried by the car running along the track and downwardly impressed with greater or less force. Said trolleys or wheels T are designed to travel between two metal plates A C, the upper edges of which are flush with the track-surface or with the paving usually laid between the track-rails. Elastically supported within and at the upper portion of the channel thus formed by these metal plates is a metal bar, which I term an "intermediate conductor." My preferred means for thus elastically supporting said intermediate conductor B consists of the tubular member D, secured to the under side of the former and having within it the coiled spring $f$, resting upon the pin and washer $e$ or upon a shoulder formed integral with the post E. This construction is shown most fully in Fig. 1; but the shoulder as an equivalent of the pin and washer is illustrated in Fig. 8. Said tubular member D, which is preferably either a casting or forging, is formed with the contact-finger $d$ projecting laterally therefrom and adapted to contact with the live terminal $g$, and said tubular member and contact-finger I usually term the "contact member." In order to keep the terminal $g$ free from short-circuiting water or from the accessions of sand or mud which might penetrate downward between the sides of the intermediate conductor B and the metal plates A C, I place said terminal within a recess or box A', the ceiling and floor of which are so arranged as to shed all water entering the same. In the construction shown in Fig. 1 said box A' is formed integral with the metal plate A and constructed either by casting or forgings, if a casting the said plate being made sufficiently short to allow thereof. Fig. 8 illustrates a construction in which said box is made separate from the plate A, the latter being formed by being rolled in suitable lengths, with a notch cut in the same for the reception of the lugs $a\ a'$, reaching into the same from the box A', and for admitting the contact-finger $d$. The object of said lugs is to more perfectly prevent water from entering the box and for retaining both box and plate in correct relative positions. The paving-stones or insulating-blocks serve to keep the said box closely pressed against the plate, said projections preventing the longitudinal displacement. Figs. 9 and 12 more fully illustrate said construction.

A further modification is that shown in Figs. 10 and 11. Here the box A' is open at the top, and the metal plate A is formed with a lateral shoulder $A^2$, covering said box, while the feed-conductor H is arranged to be laid bodily through the said box, being of course suitably insulated therefrom. This insulation is not shown in Fig. 10, but is indicated in Fig. 11, where the vertical lines $g^6$ designate blocks of insulating material through which the conductor H passes. A further modification is also here shown, in which the contact-finger $d$ is made separate from the tubular member D, but pivotally supported upon the edge of the box A' and adapted to be swung up into contact with the conductor H through the depression of its opposite end as acted upon by said tubular member.

The constructions illustrated in Figs. 10 and 11 are particularly designed for elevated tracks, in which the metal plates are in contact with the wooden ties alone. These being practically non-conductors of electricity, it makes no difference if the plates are both put into the circuit when the contact-finger $d$, pivotally supported upon the edge of the box A', is swung up into contact with the conductor.

My means for securing all the above-described parts in place wholly without the aid of bolts or spikes consists of the following: Referring to Fig. 3, M is a foundation-casting made of the cheapest of iron and formed with the two arms or abutments $m\ m'$. These castings are suitably foundationed over a drain Q (see Fig. 5) and at distances apart of from three to four feet. An insulating-block N is then laid upon each casting between said arms and the metal plates A and C laid upon said blocks, but at some distance apart. The live terminal or plug $g$ having been connected with the main feed-conductor, preferably in twos or threes, as shown in Fig. 6, and said plug inserted through the insulation $g'$ into the box A', the insulating-blocks O O'' are then laid in place, with the plate A pressing snugly back against them and the block O'' abutting against the arm $m$. I prefer to have the number and location of said boxes A' to correspond with the castings M, as shown in Fig. 5, and for each box to stand very near an edge of the insulating-block beneath it. The object of this is to enable whatever water descends in the vicinity of the said boxes to pass quickly down through the apertures made therefor into the drain Q. Having laid the plate A as described, the intermediate conductor B, with its depending contact members D, corresponding both in number and position with the boxes A', is put in position, resting upon its elastically-held posts E and having the fingers $d$ reaching into the boxes A'. The separating-blocks L are then placed between the plates A C, their upper edges coming sufficiently below the intermediate conductor B to permit the latter's having ample room to descend under the pressure of the trolley until the finger $d$ contacts with the plug $g$. Said blocks are also separated one from the other, as shown in Fig. 5, to give drainage, and their upper edges or faces are made somewhat sloping in order to better enable any accumulations of sand or mud to be washed off therefrom by the water passing down between the plates A C. The plate C is now pressed over against the blocks L and the latter against the plate A and the blocks crowded down between the plate C and the casting-arm $m'$. Other paving-stones $p$ are then laid, asphaltum or other non-porous material is flowed into all joints, and the arrangement is ready to be put into use.

In adapting my system for elevated tracks or for others wholly free from paving I form the plates A and C quite low, as shown in Figs. 13 and 14, and prolong the tubular member D far enough below the contact-finger $d$ to accommodate the spring $f$ and post E. To enable the plate A to be rolled in continuous lengths of from twelve to fifteen feet or more, corresponding to the plates C, I have the box or recess A' run from end to end of the plate A, so that it becomes a continuous groove, and utilize the internal flange $A^4$ thus formed as the part through which to pass the confining-bolt $A^3$. As will be noticed from inspection, the internal faces of said groove $A^5$ are formed at right angles with respect to each other in order to permit of its being rolled, but obliquely with respect to the horizon in order to prevent the access of dripping water to the live terminal $g$.

To confine the electric current to one section of the continuous intermediate conductor B at any one time, said sections are made equal in length to the plates or confining-walls A C and conterminous therewith. Said sections are made mechanically continuous by means of the straps $b$, bolted to the adjacent ends of each pair of sections, while they are made electrically independent by the insulating material $b'\ b''\ b^5\ b^6$ inserted between all metal surfaces otherwise in contact. The plate-sections are also electrically insulated one pair from the next by means of the block R of compressed granite or other suitable material inserted between the plate ends, as shown in Fig. 16 and also in Fig. 9.

What I claim as my invention, and for which I desire Letters Patent, is as follows, to wit:

1. In an electric-railway system, a mechanically-continuous but electrically-broken intermediate conductor normally supported with its upper face flush with the top of the channel containing it, in combination with the confining-walls forming said channel, and means whereby the local depression of said intermediate conductor shall put said local portion of the conductor into contact with an electric terminal, substantially as and for the purpose set forth.

2. The combination of an intermediate conductor, elastic supports therefor, the plates located one at each side of said intermediate conductor, and one thereof having the recess, the electric terminal or contact-point located in said recess but normally insulated from the parts aforesaid, and the member depending from said intermediate conductor and having the laterally-projecting contact-finger adapted to contact with said terminal when the intermediate conductor is pressed downward, whereby a narrow body traveling in the channel formed by said plates and downwardly impressed is adapted to complete the circuit between itself and said terminal, substantially as set forth.

3. The combination of the mechanically-continuous but electrically-broken intermediate conductor confining-walls forming a channel in which said conductor is free to rise and fall, a tubular member depending from said conductor, the coiled spring and shouldered post within said member adapted to elastically support the latter, and a contact-point normally insulated from the parts aforesaid but arranged to be put in circuit with said tubular member and conductor when the latter is pressed downward, substantially as set forth.

4. The combination of the intermediate conductor, the plates located one at each side thereof, and one having the recess, the contact post or plug projecting into said recess from the exterior but insulated from the parts aforesaid, and forming part of an electric circuit, the tubular member depending rigidly from said intermediate conductor, the coiled spring and shouldered post held in said tubular member and adapted to elastically support the same, and the contact-finger projecting from said tubular member to a point above said contact post or plug, substantially as and for the purpose set forth.

5. The combination of two parallel metal plates rigidly held with their upper edges a fixed distance apart, and thereby forming a channel, an intermediate conductor elastically held between said upper edges and free to move vertically, a member depending from said intermediate conductor and having a contact-finger projecting laterally therefrom, and a contact-point located beneath said finger, one of said plates being provided with a recess for said finger and contact-point, the ceiling and floor of said recess being made to decline toward said channel, and the upper surface of said finger being made to slope in the same direction, whereby moisture is prevented from entering or remaining in said recess, substantially as set forth.

6. The combination in a surface electric conductor, of the parallel metal plates held on edge a fixed distance apart, the intermediate conductor loosely supported in the channel thus formed and adapted when depressed to be made part of an electric circuit, the casting having the upwardly-projecting arms, the insulating-block resting on said casting between said arms and supporting said plates, means for holding said plates the required fixed distance apart, and the blocks adapted to be inserted between said arms and plates and thereby retain the latter in place without other means of fastening, substantially as set forth.

7. The combination in a surface electric conductor, of the parallel metal plates held on edge a fixed distance apart, the intermediate conductor loosely supported in the channel thus formed and adapted when depressed to be made part of an electric circuit, the casting having the upwardly-projecting arms, the insulating-block resting on said casting between said arms and supporting said plates, the blocks inserted between said plates and separated one from the other in order to provide drainage, and the blocks adapted to be inserted between said plates and arms and thereby retain the plates in position without other means of fastening, substantially as set forth.

8. The combination with the parallel plates forming the channel, the intermediate conductor loosely held in said channel and adapted when depressed to be put in circuit with an electric current, said conductor being formed in sections mechanically continuous but electrically insulated one from the other, and said plates being made conterminous with said sections and having the insulating-blocks inserted between the adjacent ends thereof, substantially as and for the purpose set forth.

9. The combination of the parallel metal plates rigidly held with their upper edges a fixed distance apart and thereby forming a channel, one of said plates being notched or slotted, the box having one open side and the projections, said box being held with its open side against said slotted plate and with its said projections entering said slot, the insulating-blocks in said box, the contact-plug supported by said blocks and connected with an electric current, the intermediate conductor loosely held in said channel, and the contact-finger connected with said conductor and reaching through said slot into said box, and adapted, when the said conductor is depressed, to meet said contact-plug, substantially as set forth.

10. The combination of the metal plates held on edge a fixed distance apart and insulated from similar plates longitudinally continuous therewith, a mechanically-continuous but electrically-broken intermediate conductor normally supported with its upper face flush with the top edges of said plates, and means whereby the local depression of said conductor shall complete the circuit between a normally-insulated conductor and a trolley contacting with said plates and intermediate conductor, substantially as set forth.

11. The combination of the metal plates held on edge a fixed distance apart, one of said plates being notched or slotted, the box having one open side adapted to be held in place over said notch or slot, the live terminal located in said box but insulated therefrom, the intermediate conductor elastically supported in the channel formed between said plates, and the contact-finger rigidly connected with said intermediate conductor and normally held with its end above said live terminal, substantially as and for the purpose set forth.

In testimony that I claim the foregoing invention I have hereunto set my hand this 4th day of February, 1899.

LOWELL MASON MAXHAM.

Witnesses:
A. B. UPHAM,
GUY H. HOLLIDAY.